United States Patent
Chung et al.

(10) Patent No.: US 9,385,979 B1
(45) Date of Patent: Jul. 5, 2016

(54) CUSTOMIZING POSTS BY ACTIVITY TYPE AND CLIENT TYPE

(75) Inventors: Irene Chung, Mountain View, CA (US); Ryo Misha Urano, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 405 days.

(21) Appl. No.: 13/537,647

(22) Filed: Jun. 29, 2012

Related U.S. Application Data

(60) Provisional application No. 61/614,717, filed on Mar. 23, 2012.

(51) Int. Cl.
*H04L 12/58* (2006.01)

(52) U.S. Cl.
CPC ..................................... *H04L 51/06* (2013.01)

(58) Field of Classification Search
CPC ......... G06F 17/30; G06F 15/16; H04L 51/00; H04L 61/00
USPC .......................................... 709/204, 219, 246
See application file for complete search history.

(56) References Cited

U.S. PATENT DOCUMENTS

| | | | |
|---|---|---|---|
| 6,130,938 A | 10/2000 | Erb | |
| 6,192,119 B1 | 2/2001 | Wilson | |
| 6,697,478 B1 | 2/2004 | Meldrum et al. | |
| 6,754,322 B1 | 6/2004 | Bushnell | |
| 6,760,745 B1 * | 7/2004 | Tan et al. | 709/203 |
| 6,990,629 B1 * | 1/2006 | Heaney et al. | 715/200 |
| 7,106,848 B1 | 9/2006 | Barlow et al. | |
| 7,366,990 B2 | 4/2008 | Pitroda | |
| 7,555,110 B2 | 6/2009 | Dolan et al. | |
| 7,610,287 B1 | 10/2009 | Dean et al. | |
| 7,742,468 B2 | 6/2010 | Vagelos | |
| 2002/0137490 A1 | 9/2002 | Gallant | |
| 2002/0143874 A1 | 10/2002 | Marquette et al. | |
| 2004/0258220 A1 | 12/2004 | Levine et al. | |
| 2005/0152521 A1 | 7/2005 | Liljestrand | |
| 2006/0026288 A1 | 2/2006 | Acharya et al. | |
| 2006/0077957 A1 | 4/2006 | Reddy et al. | |
| 2006/0206604 A1 | 9/2006 | O'Neil et al. | |

(Continued)

FOREIGN PATENT DOCUMENTS

WO     WO02079984     10/2002

OTHER PUBLICATIONS

Adamic et al., "A Social Network Caught in the Web," Internet Journal, First Monday, Jun. 2, 2003, pp. 1-22, vol. 8, No. 6.

(Continued)

*Primary Examiner* — Brian J Gillis
*Assistant Examiner* — Steve Lin
(74) *Attorney, Agent, or Firm* — Patent Law Works LLP

(57) ABSTRACT

A system and method for per-client, per-type customizations to posts in an activity stream comprises an extraction pipeline and a rendering pipeline. The extraction pipeline can include a library of embedded code, data type taxonomy and an embed converter. The data type taxonomy is coupled to an activity source to receive activity information, and to produce a first protocol buffer. The embed converter produces a type-specific protocol buffer from the first protocol buffer and embedded code based in part upon the type of activity and the type of client. The type-specific protocol buffer is provided to the client to process activity information or present activity information. The disclosure also includes a method for processing a post in an activity stream on a per-client, per-type basis.

25 Claims, 12 Drawing Sheets

(56) References Cited

U.S. PATENT DOCUMENTS

| | | | |
|---|---|---|---|
| 2007/0061486 A1* | 3/2007 | Trinh et al. | 709/246 |
| 2007/0067495 A1* | 3/2007 | Levy | 709/246 |
| 2007/0127631 A1 | 6/2007 | Difiglia | |
| 2007/0171898 A1 | 7/2007 | Salva | |
| 2007/0173236 A1 | 7/2007 | Vishwanathan et al. | |
| 2007/0248077 A1 | 10/2007 | Mahle, Jr. et al. | |
| 2008/0056475 A1 | 3/2008 | Brannick et al. | |
| 2008/0192656 A1 | 8/2008 | Vagelos | |
| 2010/0218087 A1* | 8/2010 | Knobel | 715/236 |
| 2011/0098156 A1 | 4/2011 | Ng et al. | |
| 2011/0307522 A1* | 12/2011 | Futty et al. | 707/802 |
| 2012/0079023 A1* | 3/2012 | Tejada-Gamero et al. | 709/204 |
| 2013/0095864 A1* | 4/2013 | Marovets | 455/466 |
| 2013/0298217 A1* | 11/2013 | Jasper et al. | 726/9 |
| 2014/0372518 A1* | 12/2014 | Moore et al. | 709/203 |

OTHER PUBLICATIONS

Agarwal et al., "Enabling Real-Time User Interests for Next Generation Activity-Oriented Social Networks," Thesis submitted to the Indian Institute of Technology Delhi, Department of Computer Science & Engineering, 2005, 70 pgs.

Anwar et al., "Leveraging 'Social-Network' Infrastructure to Improve Peer-to Peer Overlay Performance: Results from Orkut," University of Illinois at Urbana-Champaign USA, 2005, 9 pgs.

AT&T Personal Reach Service: Benefits and Features, Mar. 29, 2010, 7 pgs.

AT&T Personal Reach Service: Personal Reach Service, Mar. 29, 2010, 2 pgs.

Baird et al., "Neomillennial User Experience Design Strategies: Utilizing Social Networking Media to Support "Always On" Learning Styles," J. Educational Technology Systems, vol. 34(1), 2005-2006, Baywood Publishing Co., Inc., pp. 5-32.

Boyd, et al., "Social Network Sites: Definition, History, and Scholarship," Journal of Computer-Mediated Communication, International Communication Association, 2008, pp. 210-230.

Churchill et al., "Social Networks and Social Networking," IEEE Computer Society, Sep.-Oct. 2005, pp. 14-19.

Cohen et al., "Social Networks for Creative Collaboration," C&C '05, Apr. 12-15, 2005, pp. 252-255, London, United Kingdom.

Decker et al., "The Social Semantic Desktop," Digital Enterprise Research Institute, DERI Galway, Ireland, DERI Innsbruck, Austria, DERI Technical Report, May 2, 2004, 7 pgs.

Dukes-Schlossberg et al., "Battlefield Awareness and Data Dissemination Intelligent Information Dissemination Server," Air Force Research Laboratory, Rome Research Site, Rome, NY, Nov. 1, 1999, 31 pgs.

Eagle et al., "Social Serendipity: Proximity Sensing and Cueing," MIT Media Laboratory Technical Note 580, May 2004, 18 pgs.

Erickson et al., "Social Translucence: Using Minimalist Visualizations of Social Activity to Support Collective Interaction," Designing Information Spaces: The Social Navigation Approach, Springer-verlag: London, 2003, pp. 1-19.

Gross et al., "Information Revelation and Privacy in Online Social Networks," WPES '05, Alexandria, Virginia, Nov. 7, 2005, pp. 71-80.

Hammond et al., "Social Bookmarking Tools (I)," D-Lib Magazine, Apr. 2005, vol. II, No. 4, ISSN 1082-9873, 23 pgs.

Heer et al., "Vizster: Visualizing Online Social Networks," University of California, Berkeley, 8 pgs.

International Search Report, International Application No. PCT/US2008/005118, Sep. 30, 2008, 2 pgs.

Leonard, "You Are Who You Know," Internet, retrieved at http://www.salon.com, Jun. 15, 2004, 15 pgs.

LiveJournal, "FAQ #163: How Do I Find a Syndicated Account?" Last Updated: thebubba, Jan. 6, 2004, 2 pgs.

Marwick, "Selling Your Self: Online Identity in the Age of a Commodified Internet," University of Washington, 2005, 192 pgs.

MediaSift Ltd., DataSift: Realtime Social Data Mining Platform, Curate and Data Mine the Real Time Web with DataSift, Dedipower, Managed Hosting, May 13, 2011, 1 pg.

Metcalf et al., "Spatial Dynamics of Social Network Evolution," 23rd International Conference of the System Dynamics Society, Jul. 19, 2005, pp. 1-13.

Mori et al., "Real-world Oriented Information Sharing Using Social Networks," Group '05, Sanibel Island, Florida, USA, Nov. 6-9, 2005, pp. 81-84.

Murchu et al., "Online Social and Business Networking Communities," Digital Enterprise Research Institute DERI Technical Report, National University of Ireland, Aug. 8, 2004, 22 pgs.

Nardi et al., "Blogging as Social Activity, or, Would You Let 900 Million People Read Your Diary?" CSCW'04, Nov. 6-10, 2004, vol. 6, Issue 3, Chicago, Illinois, pp. 222-231.

Neumann et al., "Semantic social network portal for collaborative online communities," Journal of European Industrial Training, 2005, Emerald Group Publishing, Limited, vol. 29, No. 6, pp. 472-487.

Ring Central, Inc., Internet, retrieved at http://www.ringcentral.com, Apr. 19, 2007, 1 pg.

Singh et al., "CINEMA: Columbia InterNet Extensible Multimedia Architecture," Department of Computer Science, Columbia University, pp. 1-83.

Steen et al., "Development of we-centric, context-aware, adaptive mobile services requires empathy and dialogue," Freeband FRUX, Oct. 17, 2005, Internet Journal, Netherlands, pp. 1-4.

Superfeedr Track, Internet, retrieved at http://blog.superfeedr.com/track/filter/xmpp/pubsubhubbub/track, May 13, 2011, 8 pgs.

Twitter Blog: Tracking Twigger, Internet, retrieved at http://blog.twitter.com/2007/09/tracking-twitter.html, May 13, 2011, 2 pgs.

Twitter Announces Fire Hose Marketplace: Up to 10K Keyword Filters for 30 Cents, Internet, retrieved at http://www.readywriteweb.com/archives/twitter_announces_fire_hose_marketplace_up_to_10k.php, May 13, 2011, 7 pgs.

Van Eijk et al., "We-centric, context-aware, adaptive mobile service bundles," Freeband, Telematica Instituut, TNO telecom, Nov. 30, 2004, 48 pgs.

Wenger et al., "Technology for Communities," CEFRIO Book Chapter v 5.2, Jan. 18, 2005, pp. 1-15.

* cited by examiner

CUSTOMIZING POSTS BY ACTIVITY TYPE AND CLIENT TYPE

CROSS REFERENCE TO RELATED APPLICATIONS

This application claims priority under 35 USC §119(e) to U.S. Application No. 61/614,717, entitled "Customizing Posts by Activity Type and Client Type" filed Mar. 23, 2012, the entirety of which is herein incorporated by reference.

BACKGROUND

The present disclosure relates to electronic communication and the delivery of activity streams. In particular, the present disclosure relates to per-client, per-type customizations to posts in an activity stream.

Users once operated their computing devices with a single browser showing a single webpage, new methods for delivering information such as activity on social networks have been developed. For example, new user interfaces in social networking and messaging tools provide new user interfaces for delivering an activity stream of information. From this activity stream user interface, users can share links, photos, videos, status messages and comments organized in streams or conversations and visible in the user's inbox.

Current systems and methods for providing these user activities have been limited to utilizing a predefined and fixed format for sending activity information from the activity sources and presenting the activity information at the client device. Attempts to customize presentation of the activity information and possible actions related to the activity information are difficult and must be done manually. This is not a trivial process and requires changes to the presentation template, the data format, and the JavaScript classes. Furthermore, there are new actions that can be taken in response to different activities (e.g., posts) that are addressed by current methods for processing activities.

SUMMARY

The present disclosure overcomes the deficiencies and limitations of the prior art at least in part by providing a system and associated methods for per-client, per-type customizations to posts in an activity stream. In some examples, a system for per-client, per-type customizations comprises an extraction pipeline and a rendering pipeline. The extraction pipeline can include a library of embedded codes, data type taxonomy and an embed converter. The data type taxonomy is coupled to an activity source to receive activity information, and to produce a first protocol buffer. The embed converter produces a type-specific protocol buffer from the first protocol buffer and the embedded code based in part upon the type of activity and the type of client. The type-specific protocol buffer is provided to the client device to process activity information or present activity information. The present disclosure also includes a method for processing a post in an activity stream including: receiving a client type corresponding to a client device; receiving activity information from an activity source; receiving an activity type; creating a first protocol buffer using the activity type and the activity information; adding embedded code to create a second protocol buffer, the embedded code selected based in part upon the client type and the activity type; and sending the second protocol buffer for rendering of the activity information.

BRIEF DESCRIPTION OF THE DRAWINGS

The disclosure is illustrated by way of example, and not by way of limitation in the figures of the accompanying drawings in which like reference numerals are used to refer to similar elements.

DETAILED DESCRIPTION

Example Overview

Figure 1:
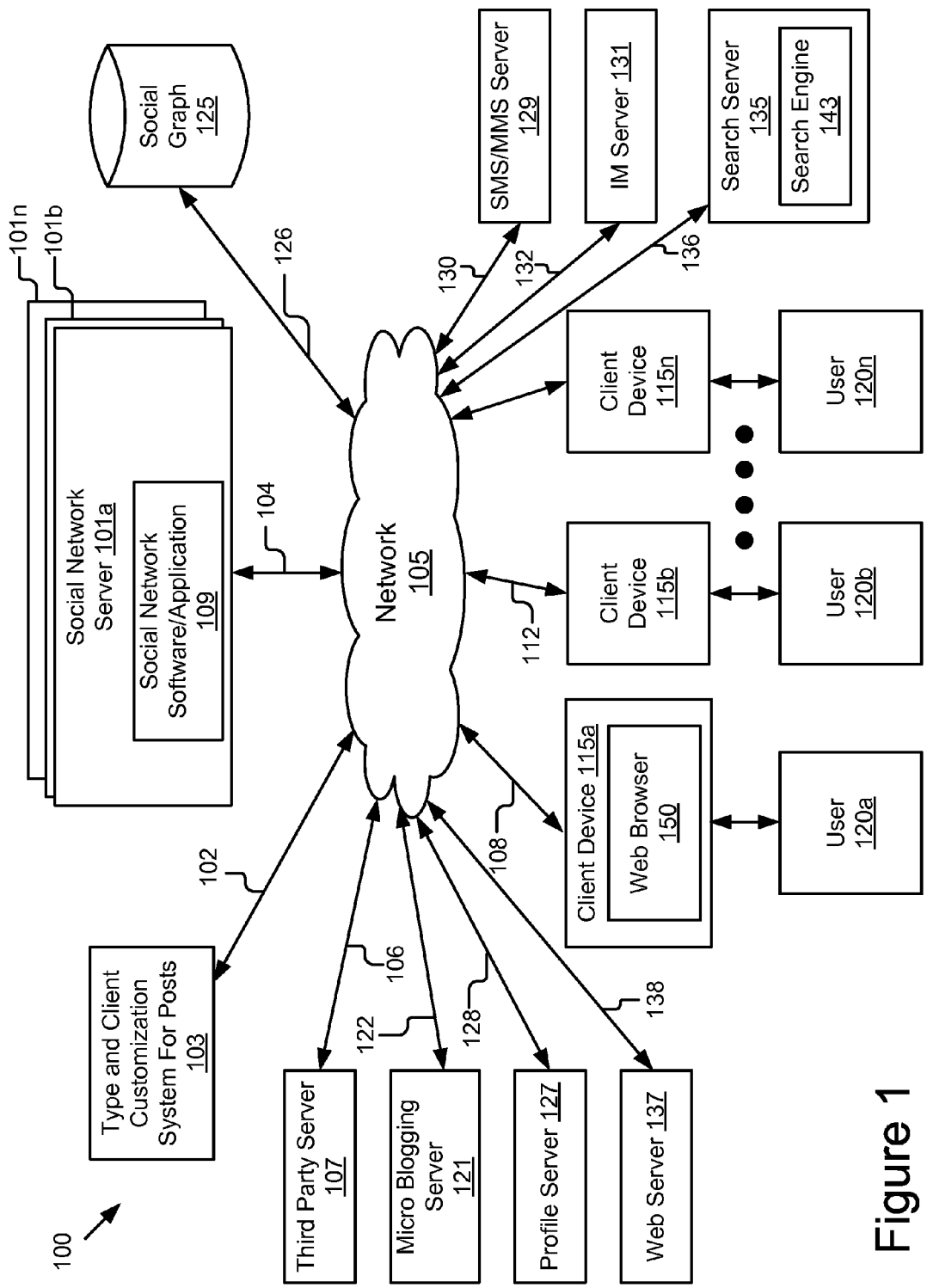
FIG. 1 is a high-level block diagram illustrating an architecture including a system for per-client, per-type customizations to posts in an activity stream according to some embodiments of the present disclosure.

The description includes a system and associated methods for per-client, per-type customizations to posts in an activity stream. In some embodiments, the system includes an extraction pipeline and a rendering pipeline. In some examples, the extraction pipeline receives activity information from an activity source (e.g., a social network server, a search server, a web server, a third party server, etc.). The extraction pipeline processes the activity information to create a first protocol buffer. The term protocol buffer as used herein encompasses its plain and ordinary meaning including, but not limited to, a mechanism for encoding structured data in an extensible format. In one embodiment, the first protocol buffer is a generic schema.org protocol buffer. In another embodiment, the first protocol buffer is a serialization format with an interface description language. The extraction pipeline adds embedded code to the first protocol buffer and produces a type-specific protocol buffer from the first protocol buffer. For example, the extraction pipeline processes the generic schema.org protocol buffer and then converts it to a type-specific protocol buffer based in part upon an activity type and a client type. In general, embedded code refers to embedded code, files, data, objects or other information. In some embodiments, embedded code includes a type-specific protocol buffer, Java, JavaScript, one or more custom templates, and custom styling. The extraction pipeline provides the type-specific protocol to the client device for processing or presenting the activity information. For example, the client device processes the type-specific protocol buffer to generate a type-specific template for displaying the activity information.

In some embodiments, the extraction pipeline receives a client type corresponding to a client device, activity information and an activity type for the activity information from the client device. The extraction pipeline creates a type-specific protocol buffer based in part upon the client type and the activity type, and converts the type-specific protocol buffer to a generic protocol buffer. The extraction pipeline sends the generic protocol buffer to an activity source, causing the activity source to create an activity.

In some embodiments, the rendering pipeline retrieves activity information from one or more activity sources, and encodes the activity information and an activity type for the activity information. Examples of an activity type include, but not limited to, an activity type for posts from a particular source (e.g., a social network), an activity type for posts from a second source (e.g., a blog), an activity type for information that has a unique set of actions (e.g., the sharing of a photo) and an activity type for a particular online service, etc. The rendering pipeline encodes the activity information and the activity type into encoded information, and stores the encoded information in a storage device. For example, the rendering pipeline serializes the activity information into an encoded message protocol buffer (general data format). Upon receiving a request for an activity stream from a client device, the rendering pipeline retrieves the encoded information and decodes the encoded information. The rendering pipeline retrieves a custom template and a script based in part upon the activity type for the activity information and the client type for the client device. The rendering pipeline sends the decoded activity information, the custom template and the script to the client device, causing the client device to render a custom activity (e.g., a custom post) to a user using the decoded activity information, the custom template and the script.

System Overview

FIG. 1 is a high-level block diagram illustrating an architecture 100 including a system 103 for per-client, per-type customizations to posts (also referred to herein as the customization system 103 or type and client customization system for posts 103) in an activity stream according to some embodiments of the present disclosure. The illustrated architecture 100 includes client devices 115a, 115b, 115n (also referred to herein individually and collectively as 115) that are accessed by users 120a, 120b, 120n (also referred to herein individually and collectively as 120), one or more social network servers 101a-101n (also referred to herein individually and collectively as 101) and the system 103 for per-client, per-type customizations. In the illustrated embodiment, these entities are communicatively coupled via a network 105. Moreover, it should be recognized that while the present disclosure is described below primarily in the context of activities related to the social network server 101, the present disclosure is applicable to any type of online communications.

The client devices 115a, 115b, 115n in FIG. 1 are used by way of example. While FIG. 1 illustrates three client devices 115a, 115b, 115n, the present disclosure applies to any system architecture having one or more client devices 115. Although only three client devices 115 are illustrated, any numbers of client devices 115 are available to any number of users 120. Furthermore, while only one network 105 is coupled to the client devices 115, the social network server 101, the system 103 and the third party server 107, in practice any number of networks 105 can be connected to the entities. Furthermore, while only one third party server 107 is shown, the architecture 100 could include one or more third party servers 107.

In some embodiments, the social network server 101a is coupled to the network 105 via signal line 104. The social network server 101a also includes a social network software/application 109. It will be recognized that though only three social network servers 101a-101n are shown, any number of social network servers 101 may be present. A social network is any type of social structure where the users are connected by a common feature. The common feature includes relationships/connections, e.g., friendship, family, work, an interest, etc. The common features are provided by one or more social networking systems, such as those included in the architecture 100, including explicitly defined relationships and relationships implied by social connections with other online users, where the relationships form a social graph 125. In some examples, the social graph 125 can reflect a mapping of these users and how they are related. Furthermore, it should be understood that social network server 101a and social network software/application 109 are representative of one social network and that there are multiple social networks 101b ... 101n coupled to the network 105, each having its own server, application and social graph. For example, a first social network is more directed to business networking, a second is more directed to or centered on academics, a third is more directed to local business, a fourth is directed to dating and others of general interest or a specific focus.

While shown as stand-alone server in FIG. 1, in other embodiments all or part of the system 103 for per-client, per-type customizations could be part of the third party server 107 that is connected to the network 105 via signal line 106. The system 103 interacts with the other servers 101, 107, 121, 127, 129, 131, 135, 137 via the network 105. The system 103 is also coupled for communication with the client device 115a, which is connected to the network 105 via signal line 108. The user 120a interacts with the client device 115a. Similarly, the client device 115b is coupled to the network 105 via signal line 112 and the user 120b interacts with the client device 115b. It should be recognized that the system 103 for per-client, per-type customizations can be stored in any combination of the devices and servers, or in only one of the devices or servers.

The network 105 is a conventional type, wired or wireless, and may have any number of configurations such as a star configuration, token ring configuration or other configurations. Furthermore, the network 105 may comprise a local area network (LAN), a wide area network (WAN) (e.g., the Internet), and/or any other interconnected data path across which multiple devices may communicate. In yet another embodiment, the network 105 may be a peer-to-peer network. The network 105 may also be coupled to or includes portions of a telecommunications network for sending data in a variety of different communication protocols. In yet another embodiment, the network 105 includes Bluetooth communication networks or a cellular communications network for sending and receiving data such as via short messaging service (SMS), multimedia messaging service (MMS), hypertext transfer protocol (HTTP), direct data connection, WAP, email, etc.

The system 103 for per-client, per-type customizations interacts with other systems 107, 115, 121, 125, 127, 129, 131 and 135 to retrieve/receive activity information or an activity stream and generate information or messages. The system 103 is coupled to the network 105 by signal line 102. The system 103 cooperates with the client device 115 to generate and present user interfaces that allow the user 120 to view the activity stream. In some embodiments, the system 103 receives activity information from the other systems 107, 121, 125, 127, 129, 131 and 135. The customization system 103 processes this information to generate the activity stream. The customization system 103 interacts with the user 120 via client devices 115 to present the promotion information. For example, the customization system 103 interacts with the web browser 150 of the client devices 115 to receive inputs and generate user interfaces as will be described in more detail below. In another example, the customization system 103 generates activity messages and promotional messages and sends replies or commands to the related electronic communications from a Short Message Service (SMS)/Multimedia Messaging Service (MMS) server 129, an instant messaging (IM) server 131, a web server 137, and/or the third party server 107. In yet another example, the customization system 103 also receives data related to electronic communication from a search server 135 that includes a search engine 143 and is coupled to the network 105 via signal line 136. In some embodiments, the search server 135 includes a search engine 143 for retrieving results that match search terms from the Internet. The web browser 150 and the customization system 103 are used to manage and send data to and from the third party server 107 via signal line 106, the micro-blogging server 121 via signal line 122, the profile server 127 via signal line 128, the client devices 115 via signal lines 108 and 112, the social graph 125 via signal line 126, the SMS/MMS server 129 via signal line 130, the IM server 131 via signal line 132 and the web server 137 via signal line 138. Although depicted in FIG. 1 as separate from the social network server 101 and the social network application 109, it should be understood that in some embodiments, the customization system 103 could be part of the social network server 101 or the social network application 109.

The system 103 for per-client, per-type customizations is particularly advantageous because it provides per-client customization. Per-client customizations enable the possibility of many different types of client (e.g. desktop, native mobile, mobile app, tablet, etc.) on the same codebase. The customization system 103 is advantageous because it: 1) provides greater code reuse via common building-block components; 2) provides a single system/solution; 3) allows multiple teams/individuals to develop custom posts standalone and in parallel; 4) supports multi-client use cases; 5) provides built-in support for common leak protection; and 6) provides built-in support for easy late-loading to minimize downloads and reduce latency.

In some embodiments, the social network server 101, the customization system 103, the third party server 107, the micro-blogging server 121, the profile server 127, the SMS/MMS server 129, the IM server 131, the search server 135 and the web server 137 can be any computing devices such as hardware servers including a processor, memory, and network communication capabilities. The client device 115a, 115b . . . 115n can be a computing device, for example, a laptop computer, a desktop computer, a tablet computer, a mobile telephone, a personal digital assistant (PDA), a mobile email device, a portable game player, a portable music player, a television with one or more processors embedded therein or coupled thereto or any other electronic device capable of accessing a network.

Customization System 103

Figure 2A:
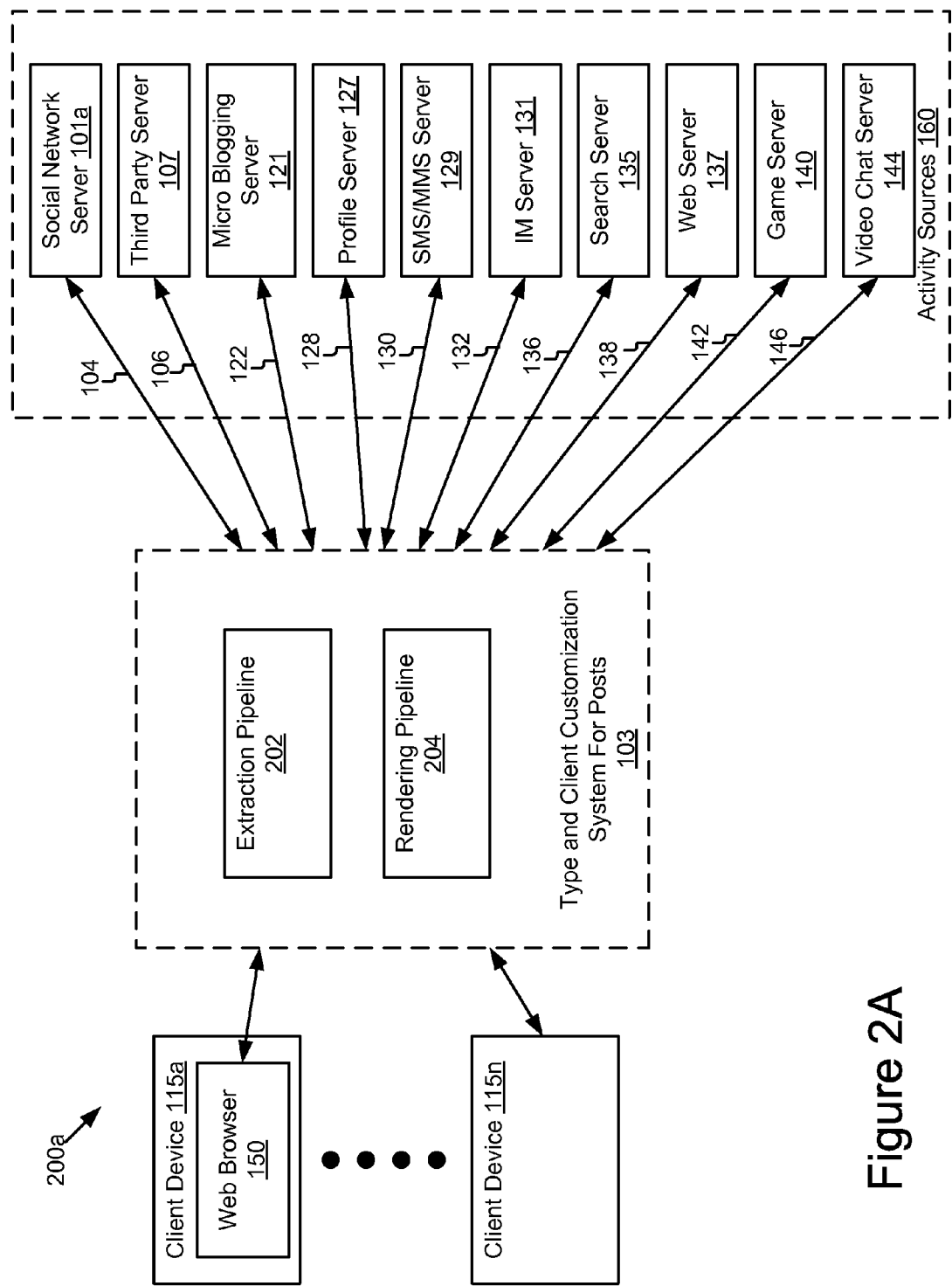
FIGS. 2A-2C are block diagrams of the architecture including a system for per-client, per-type customizations for posts according to some embodiments of the present disclosure.
Figure 2B:
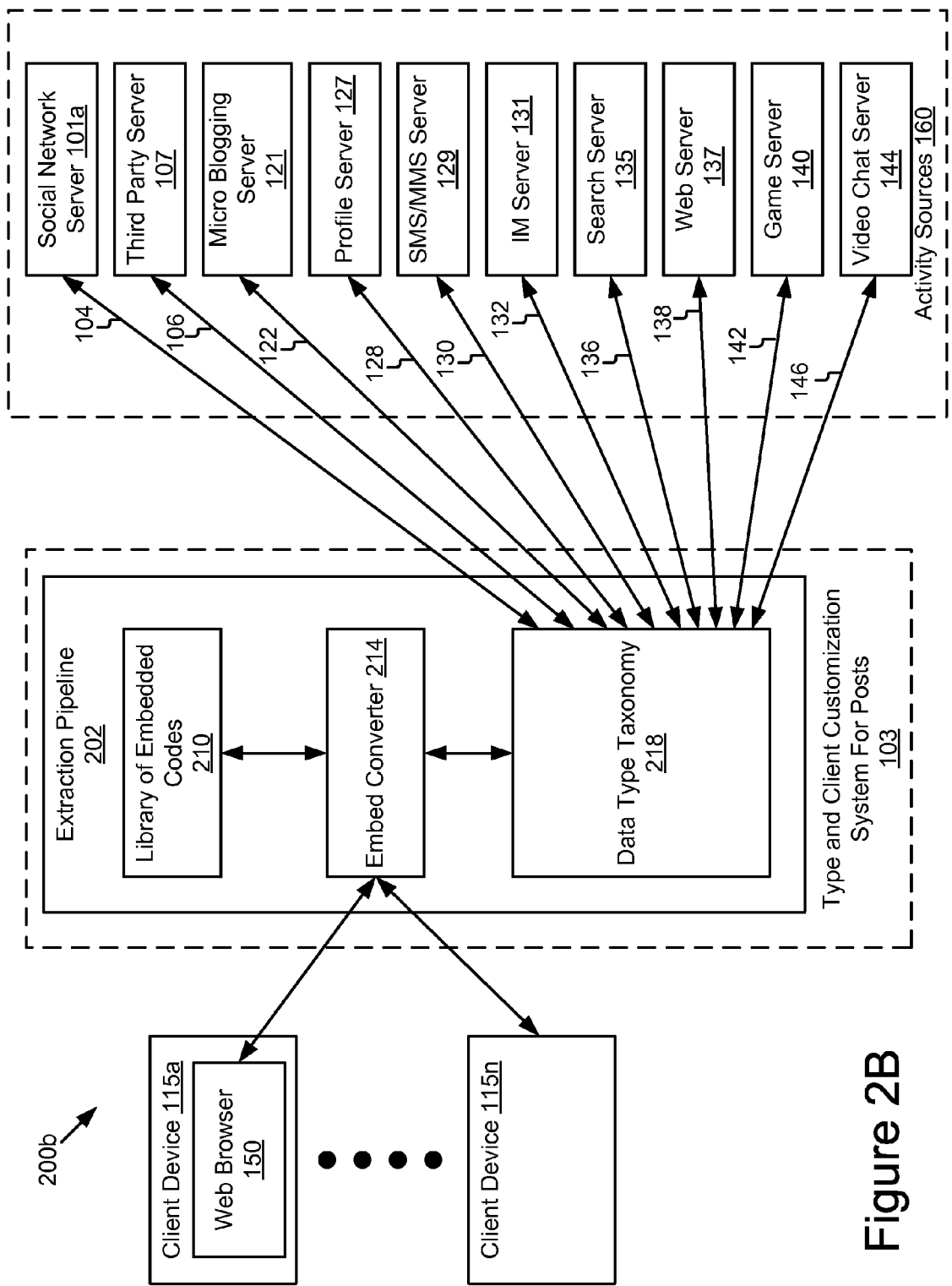
Figure 2C:
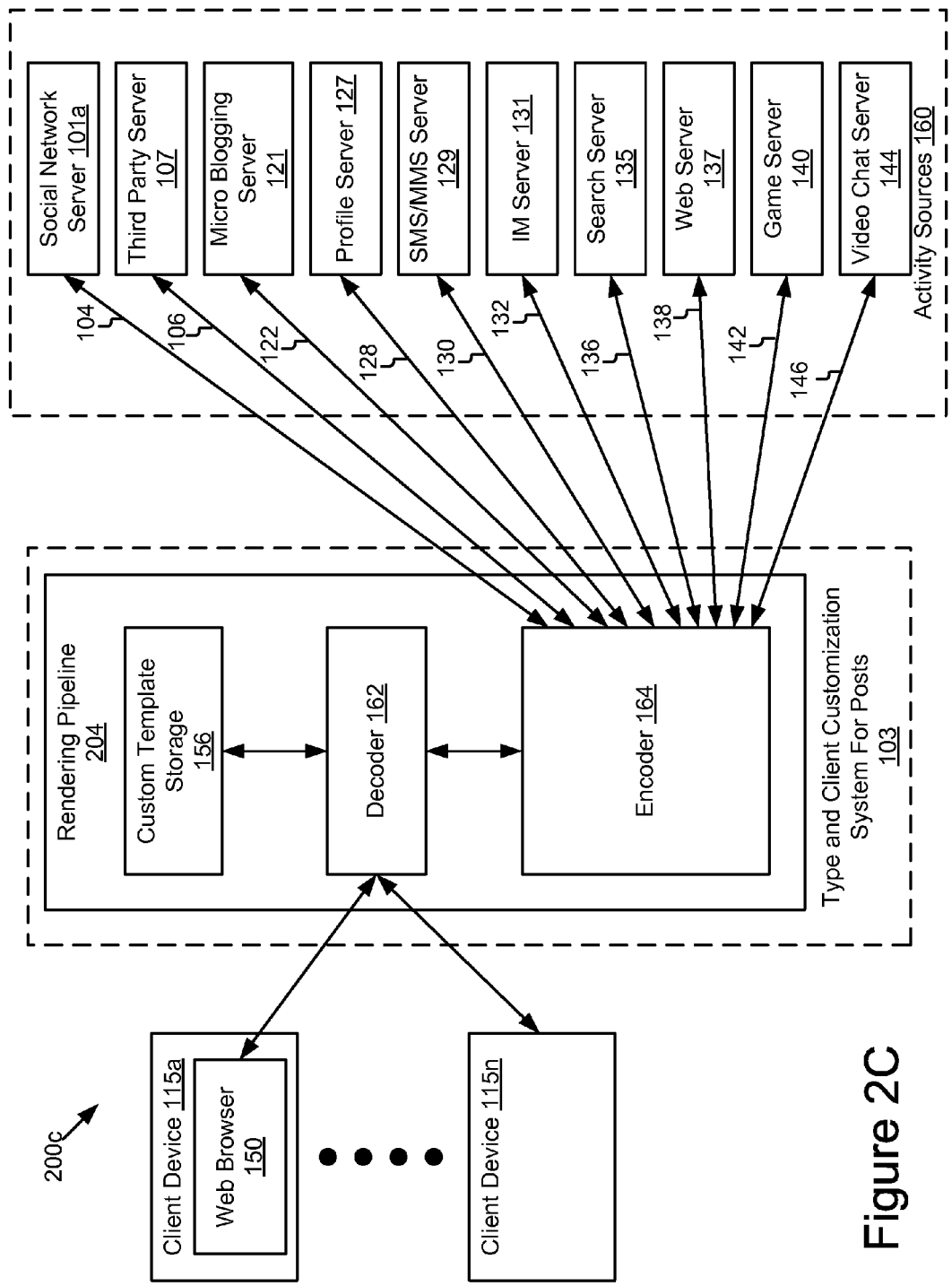

FIGS. 2A-2C are block diagrams of the architecture 200a, 200b and 200c including a system 103 for per-client, per-type customizations for posts according to some embodiments of the present disclosure. FIGS. 2A-2C show the customization system 103 in more detail. In FIGS. 2A-2C, like reference numerals have been used to reference like components with the same or similar functionality that has been described above with reference to FIG. 1. Further, since those components have been described above that description will not be repeated here. In some embodiments, the plurality of client devices 115a-115n includes the web browser 150 and is coupled for communication with the customization system 103. The customization system 103 and the web browsers 150 cooperate to generate and present for the user the posts of the present disclosure. The customization system 103 comprises an extraction pipeline 202 and a rendering pipeline 204. The activity sources 160 include one or more from the group of the social network server 101, the third party server 107, the micro-blogging server 121, the profile server 127, the SMS/MMS server 129, the IM server 131, the search server 135 and the web server 137, all of which have been described above. The activity sources 160 may also include: a game server 140 for sending information related to an online game and receiving commands related to that game, and a video chat server 144 for sending information related to a video chat and receiving commands related to that video chat. The game server 140 is coupled to the customization system 103 by signal line 142. The video chat server 144 is coupled to the customization system 103 by signal line 146.

As shown, the second embodiment for the architecture 200a, 200b and 200c includes a plurality of client devices 115a-115n, the customization system 103 for extracting and rendering custom posts and a plurality of activity sources 160. The system 103 for per-client, per-type customizations is particularly advantageous because each post is a mini application. More specifically, each post type has a corresponding stream app (application). The stream application is a bundle of Java, protocol buffers, JavaScript, server and client-side support, one or more rendering templates (or a set of rendering templates) and custom style sheets that define a mini application for the activity stream. Each stream app uses common post elements, for example, comment and sharing actions, author icons, classical texts, abuse reporting, etc. In some embodiments, the stream app supports share box preview, resharing preview, resharing annotations, collapse/expand user text, edit user text, edit of embedded code, abuse reporting/mute/block, options menu items, explanations, comments, endorsements, and real-time updates. The present disclosure is particularly advantageous because each stream app can also implement its own custom behaviors and appearances. In some embodiments, the stream apps are independently loaded on demand.

Referring now to FIG. 2A, the system 103 for per-client, per-type customization according to some embodiments is shown in more detail. The customization system 103 includes an extraction pipeline 202 and a rendering pipeline 204. The extraction pipeline 202 receives information from the client device 115, processes the information and provides it to an activity source 160 and then processes information from the activity source 160 so that it can be provided to the client device 115. Some embodiments of the extraction pipeline 202 are described in more detail below with reference to FIGS. 2B and 3B. The operation of the extraction pipeline 202 is also described below with reference to FIGS. 4-5. The rendering pipeline 204 receives information and processes it for display on the web browser 150 of the client device 115. Some embodiments of the rendering pipeline 204 are described in greater detail below with reference to FIGS. 2C and 3C. The operation of the rendering pipeline 204 is also described below with reference to FIGS. 6-8. The customization system 103 is advantageous because it supports faster standalone development of independent components, provides common building block components, isolates core stream development from the development of independent components, and provides easy late loading. In other words, the customization system 103 provides a coherent framework that is extensible, provides common building block components, allows multiple teams to build custom posts standalone and in parallel and provides support for the multi-client use case.

Referring now to FIG. 2B, the extraction pipeline 202 of the system 103 for per-client, per-type customization according to some embodiments is shown in more detail. In some embodiments, the extraction pipeline 202 includes: a library 210 of embedded code, an embed converter 214, and a data type taxonomy 218.

The library 210 of embedded code can be a group of embedded codes. The embedded code provides a way to represent, transmit, store and render rich structured attachments. In some embodiments, the embedded code is defined by both client type and activity type. Each of the embedded codes includes common building block components of common types, for example, type-specific protocol buffers, a set of rendering templates or custom templates, Java, JavaScript, custom styling, e.g. via custom style sheet systems, etc. One example of a type-specific protocol buffer is shown below.

```
message PhotoUpdate {
    option (item_type)=IMAGE_OBJECT;
    extend EmbedClientItem [optional PhotoUpdate
        photo=N;
}
    optional string url=1
        [(in_item scope)=true];
    optional string description=2
        [(in_item scope)=true];
    optional Place content_location=3
        [(in_item scope)=true];
    optional string thumbnail_url=4
        [(in_item scope)=true];
    optional string proxied_thumbnail_url=5
        [(in_item scope)=false,
        (presenter)=THUMBNAIL_IMAGE_PROXY];
}
```

The embedded codes are used by the stream applications for their canonical representation of the attached content. In some embodiments, the stream out may optionally process, transform color render or suppress embedded data for display purposes. Further, in some embodiments, the embedded data is used to represent non-plain text data attached to a post when that data represents something that can be displayed or manipulated in the stream, or something that makes sense to first or third party users. Example embedded code types include: plain text, video, photo, photo album, web link, location, video conference, event, music album or song, video playlist, etc.

The embed converter 214 can be software or routines for processing the stream apps and providing information to the client device 115. More specifically, the embed converter 214 uses the library of embedded code 210 and the data type taxonomy 218 to produce content in a format displayable on the web browser 150. The embed converter 214 receives data from the activity sources 160 for presentation on the client device 115 according to the data type taxonomy 218. In other words, the activity sources 160 provide data in the data type taxonomy 218. The embed converter 214 extracts the data from the data type taxonomy 218 and then utilizes the library 210 of embedded code to present the data on the web browser 150. More specifically, the embed converter 214 formats and sends the data according to the type specific protocol buffers of the associated embedded code. For a given activity type and a given client type, the embed converter 214 may also format the data so that it is presented in an attractive and appropriate manner on the client device 115. For example, the embed converter 214 may format the data in a first manner so that it is suitable where the client device 115 is a mobile phone or the embed converter 214 can format the data in a second manner so that it is suitable for a desktop. In summary, the embed converter 214 is a lossless converter that retrieves data from the data type taxonomy 218 and uses the library 210 of embedded code that specifies presentation to output information to the client devices 115. The operation of the embed converter 214 will be better understood with reference to description below and FIGS. 4 and 5.

The data type taxonomy 218 is a classification and hierarchical organization of data types. In some embodiments, the data type taxonomy 218 is a hierarchy such as schema.org. The activity sources 160 provide data to the extraction pipeline 202 in data structures that comply with the shared definitions in the data type taxonomy 218. In some embodiments, the data type taxonomy 218 includes a protocol buffer that includes a flat name space of the known data fields. In some embodiments, a protocol buffer is a serialization format with an interface description language. Each protocol buffer has a type field that includes a subset of data type taxonomy 218 fields valid for that protocol buffer. The type field is a repeated field, indicating the inheritance hierarchy of that type (e.g., thing>creative work>article>blog post).

Referring now to FIG. 2C, the rendering pipeline 204 of the system 103 for per-client, per-type customization according to some embodiments of the customization system 103 is shown in more detail. The rendering pipeline 204 includes custom template storage 156, a decoder 162 and an encoder 164. The operation of the rendering pipeline 204 and its components will be described in more detail below with reference to FIGS. 3C and 6-8. The encoder 164 is coupled to the decoder 162 to send activity data for the web browsers 150. The encoder 164 is also coupled to the activity sources 160 to receive activity information which it sends to the decoder 162 which in turn translates the activity information into the activity stream. The decoder 162 is also coupled to the custom template storage 156 to receive information about how the activity information is to be presented on the web browser 150.

Example System

Figure 3A:
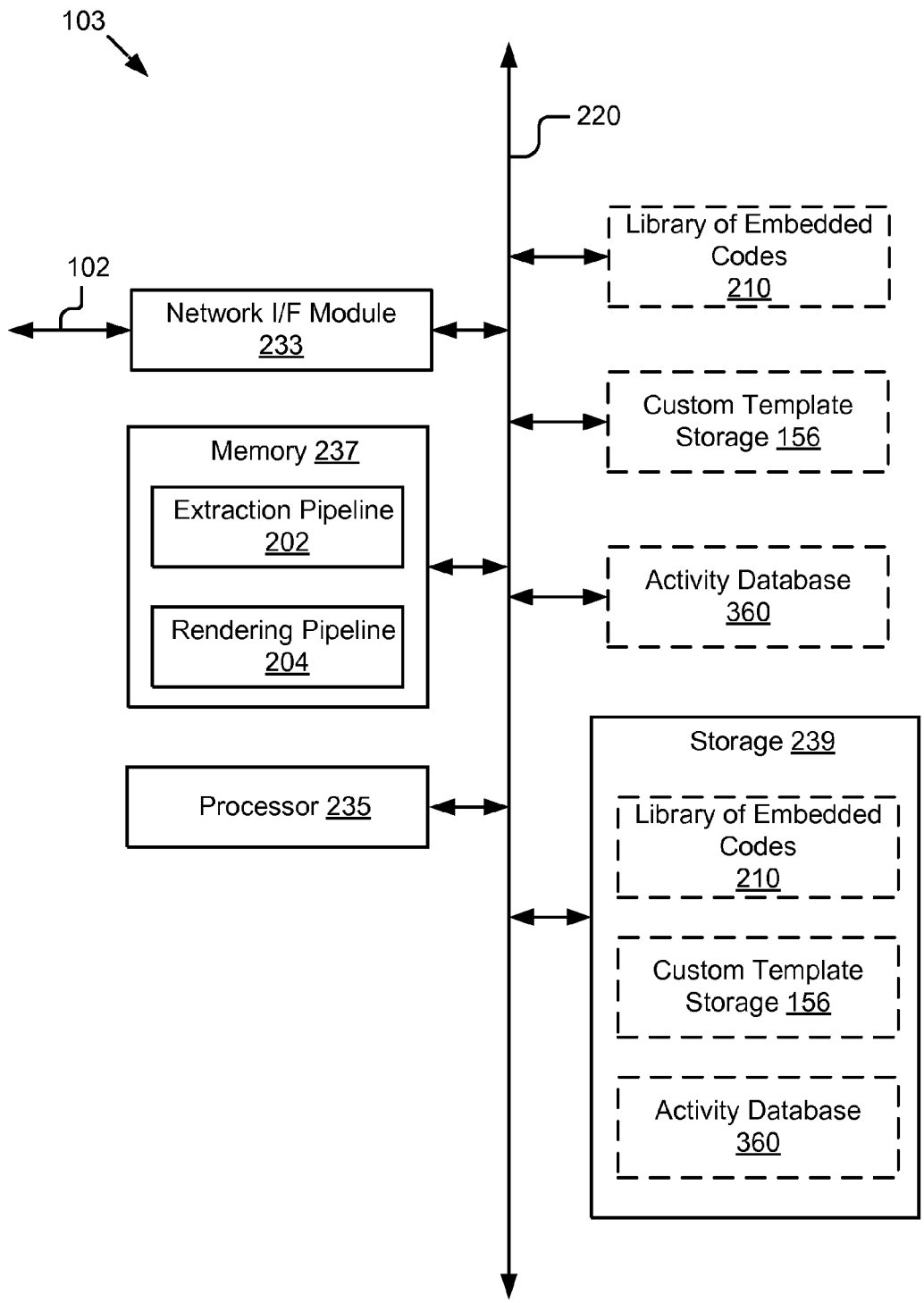
FIG. 3A is a block diagram illustrating a hardware architecture for per-client, per-type customizations to posts according to some embodiments of the present disclosure.

FIG. 3A is a block diagram illustrating a hardware architecture for a customization system 103 according to some embodiments of the present disclosure. In some embodiments, the system 103 comprises: a network interface module 233, a processor 235, a memory 237, a storage 239, the library 210 of embedded code, the custom template storage 156 and an activity database 360. The library 210 of embedded code, the activity database 360 and the custom template storage 156 are depicted using dashed lines to indicate that, in some embodiments, the library 210 of embedded code, the activity database 360 and the custom template storage 156 are part of the storage 239. These components of the system 103 are communicatively coupled by a bus 220.

The network interface module 233 is coupled to the network 105 by signal line 102 and to the bus 220. The network interface module 233 includes ports for wired connectivity such as but not limited to USB, SD, or CAT-5, etc. The network interface module 233 links the processor 235 to the network 105 that may in turn be coupled to other processing systems. The network interface module 233 provides other conventional connections to the network 105 using standard network protocols such as TCP/IP, HTTP, HTTPS and SMTP.

In other embodiments, the network interface module 233 includes a transceiver for sending and receiving signals using Wi-Fi, Bluetooth® or cellular communications for wireless communication.

The processor 235 comprises an arithmetic logic unit, a microprocessor, a general purpose controller or some other processor array to perform computations and provide electronic display signals to a display device. The processor 235 is coupled to the bus 220 for communication with the other components. Processor 235 processes data signals and may comprise various computing architectures including a complex instruction set computer (CISC) architecture, a reduced instruction set computer (RISC) architecture, or an architecture implementing a combination of instruction sets. Although only a single processor is shown in FIG. 3A, multiple processors may be included. Other processors, operating systems, sensors, displays and physical configurations are possible.

The memory 237 stores instructions and/or data that may be executed by the processor 235. The memory 237 is coupled to the bus 220 for communication with the other components. The instructions and/or data may comprise code for performing any and/or all of the techniques described herein. The memory 237 may be a dynamic random access memory (DRAM) device, a static random access memory (SRAM) device, flash memory or some other memory device known in the art.

In the illustrated embodiment, the memory 237 includes the extraction pipeline 202 and the rendering pipeline 204. The extraction pipeline 202 and the rendering pipeline 204 are described in more detail below with reference to FIGS. 3B and 3C, respectively.

In some embodiments, the storage 239 stores data, information and instructions used by the customization system 103. Such stored information includes information about users, information about messages, stream applications, and other information retrieved from the activity sources 160. In some embodiments, the storage 239 also stores data and other information utilized by the customization system 103 from the client devices 115. In another embodiment, the library 210 of embedded code or the custom template storage 156 is part of the storage 239. The storage 239 is a non-volatile memory or similar permanent storage device and media such as a hard disk drive, a floppy disk drive, a CD-ROM device, a DVD-ROM device, a DVD-RAM device, a DVD-RW device, a flash memory device, or some other mass storage device known in the art for storing information on a more permanent basis. The storage 239 is coupled to the bus 220 for communication with other components of the customization system 103.

In some embodiments (See also FIG. 3C), the storage 239 stores information retrieved by the activity streams backend 154, in particular, collector modules 352, 354, 356 and 358 and the activity database 360. In some embodiments, the storage 239 also stores data and other information utilized by the activity streams front end 152. The storage 239 is coupled by the bus 220 for communication with other components 152, 154, 156, 233, 235 and 237 of the rendering pipeline 204.

The library 210 of embedded code has been described above with reference to FIG. 2B. The library 210 of embedded code has a similar operation function here. The library 210 of embedded code is coupled to the bus 220 for cooperation with other components of the system 103. The custom template storage 156 and the activity database 360 are also coupled to the bus 220 for communication with other components of the system 103. The custom template storage 156 and the activity database 360 are described in more detail below with reference to FIG. 3C.

Extraction Pipeline 202

Figure 3B:
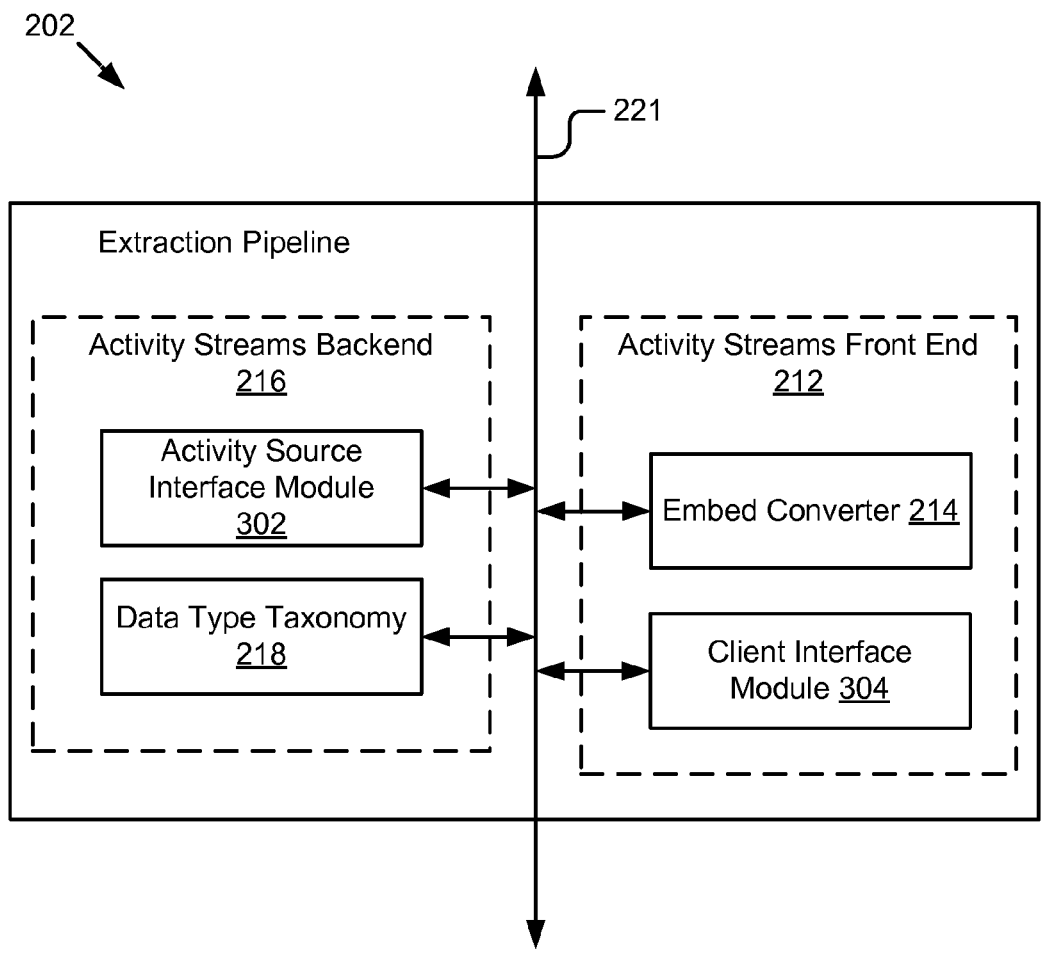
FIG. 3B is a block diagram illustrating an extraction pipeline according to some embodiments of the present disclosure.

FIG. 3B is a block diagram illustrating an extraction pipeline 202 according to some embodiments of the present disclosure. In some embodiments, the extraction pipeline 202 includes an activity streams backend 216 and an activity streams front end 212 that communicate over the software communication mechanism 221. Software communication mechanism 221 may be an object bus (such as CORBA), direct socket communication (such as TCP/IP sockets) among software modules, remote procedure calls, UDP broadcasts and receipts, HTTP connections, function or procedure calls, etc. Further, any or all of the communication could be secure (SSH, HTTPS, etc). The software communication can be implemented on any underlying hardware, such as a network, the Internet, a bus 220, a combination thereof, etc.

The activity streams backend 216 includes an activity source interface module 302 and the data type taxonomy 218. The activity source interface module 302 may be software or routines executable by the processor 235 to receive or retrieve activity information from the activity sources 160. The activity source interface module 302 cooperates with the data type taxonomy 218 to process data and other information, and sends it to the activity streams front end 212. In some embodiments, the activity source interface module 302 receives information from the activity sources 160 and stores it in a data format consistent with the data type taxonomy 218. In some embodiments, the activity streams backend 216 also includes a second embed converter (not shown) to receive and process information from the activity sources 160 and then store the processed data according to the data type taxonomy 218. The data type taxonomy 218 has been described above with reference to FIG. 2B and has the similar function or operation here. The activity source interface module 302 and the data type taxonomy 218 are coupled for communication with the other components of the extraction pipeline 202 by the software communication mechanism 221.

The activity streams front end 212 comprises the embed converter 214 and a client interface module 304. The embed converter 214 has been described above and has the same or similar functionality here. The embed converter 214 is coupled to the software communication mechanism 221 for communication with the other components of the extraction pipeline 202. In one embodiment, the client interface module 304 is communicatively coupled to the library 210 of embedded code. The client interface module 304 may be software or routines executable by the processor 235 to communicate with the client device 115. For example, the client interface module 304 receives links and indication of the client type from the client device 115. The client interface module 304 also cooperates with the embed converter 214 to send information and formatting data such as XML to the client browser 150 for presentation to the user. The client interface module 304 is also coupled to the software communication mechanism 221 for communication and cooperation with the other components of the extraction pipeline 202.

Rendering Pipeline 204

Figure 3C:
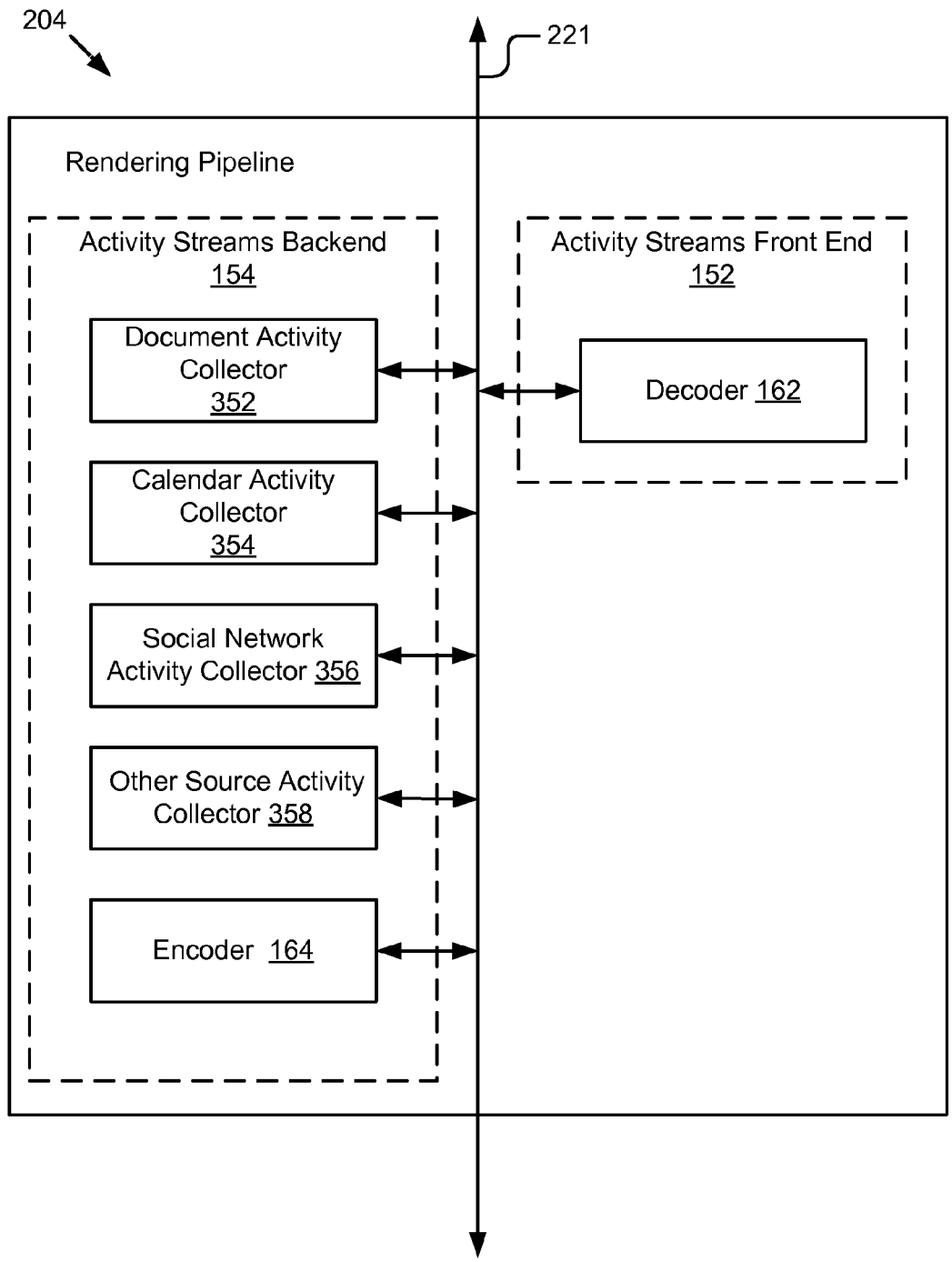
FIG. 3C is a block diagram illustrating a rendering pipeline according to some embodiments of the present disclosure.

FIG. 3C is a block diagram illustrating the rendering pipeline 204 according to some embodiments of the present disclosure. In some embodiments, the rendering pipeline 204 comprises: an activity streams backend 154 and an activity streams front end 152 that communicate over the software communication mechanism 221.

In some embodiments, the activity streams backend 154 comprises a document activity collector 352, a calendar activity collector 354, a social network activity collector 356, an other source activity collector 358, an activity database 360, and the encoder 164. These components 352, 354, 356, 358, 360 and 164 are coupled to the software communication mechanism 221 for communication with each other and other components of the rendering pipeline 204.

The document activity collector 352 may be software or routines for interacting with a document system coupled to the activity streams backend 154 via the network 105. In some embodiments, the document activity collector 352 interacts with a document management system to retrieve information such as user interactions with documents, which documents were reviewed or edited, and how much time was spent interacting with a document, etc. The document activity collector 352 in some embodiments interacts with a credential module (not shown) to retrieve the user's login name and password as well as any other information necessary to access the document system. The document activity collector 352 also stores information that has been retrieved in the activity database 360. The document activity collector 352 is coupled for communication with other document servers and the storage 239. It should be recognized that even though the document activity collector 352 has been described above as connecting and extracting information from a single document system, the document activity collector 352 may perform the same operation for a plurality of document systems that is utilized by a particular user.

The calendar activity collector 354 may be software or routines for interacting with the profile server 127 coupled to the activity streams backend 154 via the network 105. In some embodiments, the calendar activity collector 354 interacts with the profile server 127 to retrieve profile information such as calendar events. In some embodiments, the profile server 127 is a free time management web application. The calendar activity collector 354 also stores received calendar activity information in the activity database 360. The calendar activity collector 354 also sends commands and instructions to the profile server 127 to change calendar events, add calendar events, modify parties associated with events, delete events, etc.

The social network activity collector 356 may be software or routines for interacting with the one or more social network servers 101 or systems. In some embodiments, the social network activity collector 356 is coupled to the network 105 for communication and interaction with the social network server 101, the social network application 109 and the social graph 125. The social network activity collector 356 is similar to the calendar activity collector module 354 except that it collects activity information related to a user's interaction and use of a social network. The social network activity collector 356 interacts with a credential module to retrieve the user's login and password as well as other information necessary to access the social network application 109 and the social graph 125. The social network activity collector 356 retrieves and collects activity information about messages sent, messages received, information posted, posted information reviewed, change in status of friends, addition of connections, removal of connections, friend requests, and any other activity that can be undertaken by the user on the social network. The social network activity collector 356 also collects information from other individuals that are important or linked to the user. In some embodiments, the application interface (API) of the social network is used by the social network activity collector 356 to extract information. Thus, it will recognize that the social network activity collector 356 can retrieve any information related to the user from the social network. The social network activity collector 356 stores the information it collects in the activity database 360. The social network activity collector 356 is coupled by the software communication mechanism 221. Example activities include friend requests, a post to a source being monitored, or any other activity on the social network of importance to the user. The social network activity collector 356 also interacts with the social network to respond to any activity such as accepting the friend request, replying to a post or any other action on the social network that is possible in response to the activity.

The other source activity collector 358 may be software or routines for interacting with and extracting information from any other electronic communication system or any other activity sources 160. The other source activity collector 358 has the credentials and the application interface for interacting with the other activity sources 160. The other source activity collector 358 monitors the other activity sources 160 for activities of which the user wants to be notified and also can take any action with regard to the activities that is allowed by the other activity sources 160. The other source activity collector 358 collects information related to the user's interaction with those other systems. The other source activity collector 358 stores the information collected in the activity database 360. Example other sources 160 include the third party server 107, the micro-blogging server 121, the SMS/MMS server 129, the IM server 131, the search server 135 and the web server 137.

The activity database 360 is data storage for storing information received from any of the activity sources 160. In some embodiments, the activity database 360 is a database organized by user. For each user, the activity database 360 stores any activity information received from any of the activity sources 160. For example, this can include documents, document status, document interaction statistics, and social network activities such as posts, shares, invitations, status changes etc. The activity database 360 is coupled for communication with the activity collectors 352, 354, 356 and 358. The activity database 360 is also coupled to the activity streams front end 152 to provide activity information responsive to queries from the client devices 115 and to provide the raw data used to generate the activity stream.

The encoder 164 may be software or routines for encoding activity information and an activity type. In some embodiments, the encoder 164 cooperates with the other components of the activity streams backend 154 to receive activity information and an associated activity type. In some embodiments, there are multiple activity types such as an activity type for posts from a particular source (e.g., a social network), and an activity type for posts from a second source (e.g., a blog), an activity type for information that has a unique set of actions (e.g., the sharing of a photo), an activity type for a particular online service, etc. Thus the activity types may be defined by the source of the information; the type of information and the manner in which it should be presented; and the action or the group of actions that may be taken in response to the information. The encoder 164 is coupled to the other components of the activity streams backend 154 to receive activity information. The encoder 164 is also coupled to receive the activity type for the information either from the activity sources 160 or the activity database 360 or by analysis of the activity information. The encoder 164 encodes the activity information and the activity type into encoded information. For example, the encoder 164 serializes the activity information into an encoded message protocol buffer (general data format). In some embodiments, the encoder 164 stores the encoded information into the activity database 360 for access by the activity stream front end 152. In another embodiment, the encoder 164 also scrubs the information or anonymizes it before encoding.

The activity streams front end 152 is software or routines for processing requests that are received from the client devices 115. The activity streams front end 152 is coupled for communication with the client devices 115, in particular, the web browser 150. The activity streams front end 152 receives and processes requests from the client devices 115 for an activity stream. The activity streams front end 152 serves as a controller to process requests for activity streams, to send activity streams, to send formatting information for the activity streams, to send control signals to and from the client devices 115, and to send user interaction information to the activity streams backend 154. The activity streams front end 152 is coupled to receive activity stream data from the activity streams backend 154 and generate an activity stream for the user. In some embodiments, the activity streams front end 152 includes a decoder 162. The activity streams front end 152 retrieves activity stream information in an encoded or serialized format from the activity streams backend 154. The decoder 162 decodes or de-serializes the encoded information from the activity streams backend 154 into data for the custom post and an activity type. The activity streams front end 152 is also coupled to the custom template storage 156 to retrieve and use templates and scripts or send templates and scripts to the client devices 115 as requested. The activity streams front end 152 also passes on commands to the activity streams backend 154 for transmission to and execution by the activity sources 160.

The custom template storage 156 is data storage for storing information about different templates that can be used to present activity information to the user. In some embodiments, the customization system 103 has defined a number of different activity types. Each of the activity types includes a customized template for displaying information related to that activity type. In some embodiments, the customized template specifies the formatting and types of information displayed. The custom template also specifies what other actions or buttons are presented along with the activity information. For example, the actions appropriate for a comment post versus a photo being shared will be different. The custom template identifies the actions that can be taken with regard to the activity information and thereby allows customization of the rendering that is specific to the activity information. The activity type is also associated with JavaScript or a JavaScript class for use in rendering the data in the customized template. This is particularly advantageous because rather than being limited to a single method for rendering posts or being forced to create a custom rendering for each individual post, the custom template storage 156 allows the templates to be reused according to activity types which are likely to have similar characteristics. In some embodiments, the post includes additional type-specific data that can be used to decide which specific custom template to use. The custom template storage 156 is coupled for communication with the activity stream front end 152. In another embodiment, the custom template storage 156 can be accessed directly by the client device 115. In some embodiments, the custom template storage 156 is not required and the templates are compiled directly into binary files.

One or more of the document activity collector 352, the calendar activity collector 354, the social network activity collector 356, the other source activity collector 358, the encoder 164, the activity streams backend 154, the activity streams front end 152 and the decoder 162 are executable by the processor 235. In another embodiment, one or more of the document activity collector 352, the calendar activity collector 354, the social network activity collector 356, the other source activity collector 358, the encoder 164, the activity streams backend 154, the activity streams front end 152 and the decoder 162 store data that, when executed by the processor 235, causes the collectors/modules to perform the operations described below. In yet another embodiment, one or more of the document activity collector 352, the calendar activity collector 354, the social network activity collector 356, the other source activity collector 358, the encoder 164, the activity streams backend 154, the activity streams front end 152 and the decoder 162 are instructions executable by the processor 235 to provide the functionality described below with reference to FIGS. 6-8. In still another embodiment, one or more of the document activity collector 352, the calendar activity collector 354, the social network activity collector 356, the other source activity collector 358, the encoder 164, the activity streams backend 154, the activity streams front end 152 and the decoder 162 are stored in the memory 237 of the customization system 103 and are accessible and executable by the processor 235.

Methods

Figure 4:
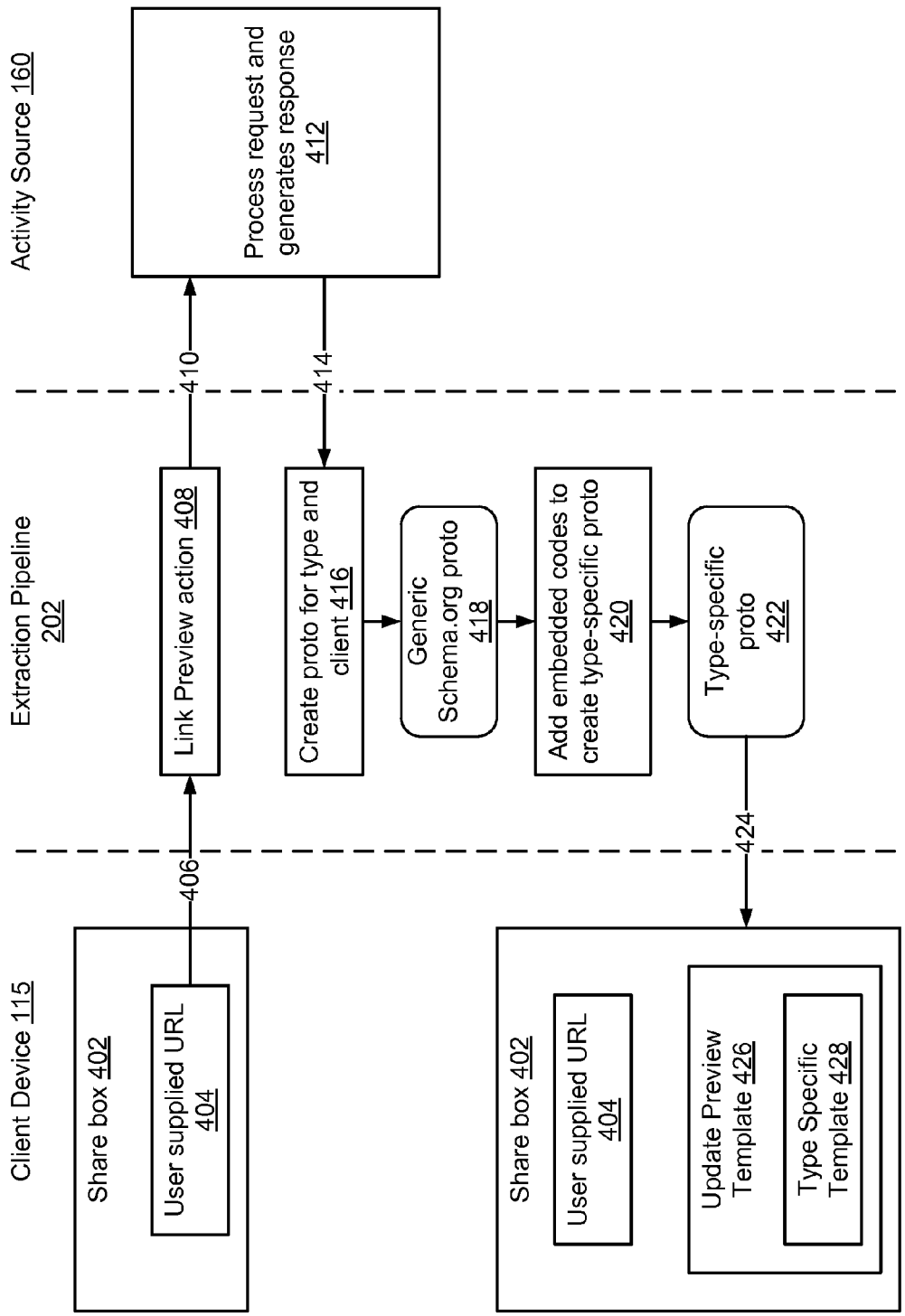
FIG. 4 is a sequence diagram of a preview action of an extraction pipeline according to some embodiments of the present disclosure.

FIG. 4 is a sequence diagram of a preview action of the extraction pipeline 202 according to some embodiments of the present disclosure. FIG. 4 shows the operations performed by the extraction pipeline 202 and its interaction with the client device 115 and the activity source 160. FIG. 4 illustrates merely one example operation; however, it can be understood how the other operations are performed by the extraction pipeline 202 in response to input about an activity stream from the client device 115 or in response to the activity information from an activity source 160. Specifically, FIG. 4 illustrates the processing of input from a share box 402 displayed on the browser 150 of the client device 115 and modifications to the appearance of that share box 402 in response to the receipt of additional activity information by the extraction pipeline 202. The process begins with the display of the share box 402 at the client device 115. The user interacts with the share box 402 and inputs a user supplied URL 404 into the share box 402. The user also selects a share button (not shown) from the user interface displayed by the client device 115. This causes the client device 115 to send 406 the user supplied URL 404 to the customization system 103, in particular the extraction pipeline 202. In some embodiments, the client device 115 also sends 406 other information such as the type of the client device 115. For example, the client device 115 may identify itself as being a desktop browser or a browser on a mobile device. In some embodiments, both the type of post or activity and the type of client are determined at the time the post is created. For example, there may be a specific field such as update metadata.namespace enumr field to specify the type of post or activity and the type of client. The user supplied URL 404 is received at the extraction pipeline 202, and a link preview action 408 is initiated. In some embodiments, the link preview action 408 creates a stream application processed by the extraction pipeline 202. Processing of the link preview action 408 causes a request (e.g., an HTTP request) to be sent 410 from the extraction pipeline 202 to the activity source 160 corresponding to the user supplied URL 404. The activity source 160 corresponding to the user supplied URL 404 processes 412 the HTTP request and generates a response, such as an HTML page. The response, HTML, is sent 414 from the activity source 160 to the extraction pipeline 202. The extraction pipeline 202 creates 416 a protocol buffer (proto) based upon the type of activity or post and/or the type of client from the response received from the activity source 160. For example, the extraction pipeline 202 creates a generic schema.org protocol buffer (proto) 418 by processing the HTML from the activity source 160, and parses the formatted metadata in the header of the page. One example of the components of a generic protocol buffer is described at http://schema.org. In some embodiments, the generic protocol buffer is stored by the extraction pipeline 202 for later use. Next, the extraction pipeline 202 adds 420 embedded code to create a type-specific protocol buffer (proto) 422. For example, the embed converter 214 processes the generic schema.org protocol buffer 418 and then converts it to a type-specific protocol buffer 422 on the server based upon the activity type and client type. For example, the embedded code can include Java, protocol buffers, JavaScript, server and client-side support, rendering template, custom style sheets, GSS, other templates and information. In some embodiments, the type-specific protocol buffer 422 is stored by the extraction pipeline 202 for later use. The type-specific protocol buffer 422 is then sent 424 from the extraction pipeline 202 to the client device 115. The client device 115 processes the type-specific protocol buffer 422 to generate the type specific template 428 that is shown by the browser (not shown) in the update preview template 426. FIG. 4 illustrates a path for information to pass from the activity source 160 to the client device 115 through the extraction pipeline 202. In this path, the information is received by the extraction pipeline 202, converted to a generic protocol buffer and then modified into a type-specific protocol buffer (using activity type and client type as an index to a library of embedded code) that is sent to the client device 115. The architecture of the present disclosure is advantageous because this two-step conversion process can be utilized for any information that is sent from the activity source 160 to the client device 115 by using the data type taxonomy 218 and the library 210 of embedded code. It should be recognized that any action or information can be sent from the activity source 160 to the client device 115 in a similar manner.

Figure 5:
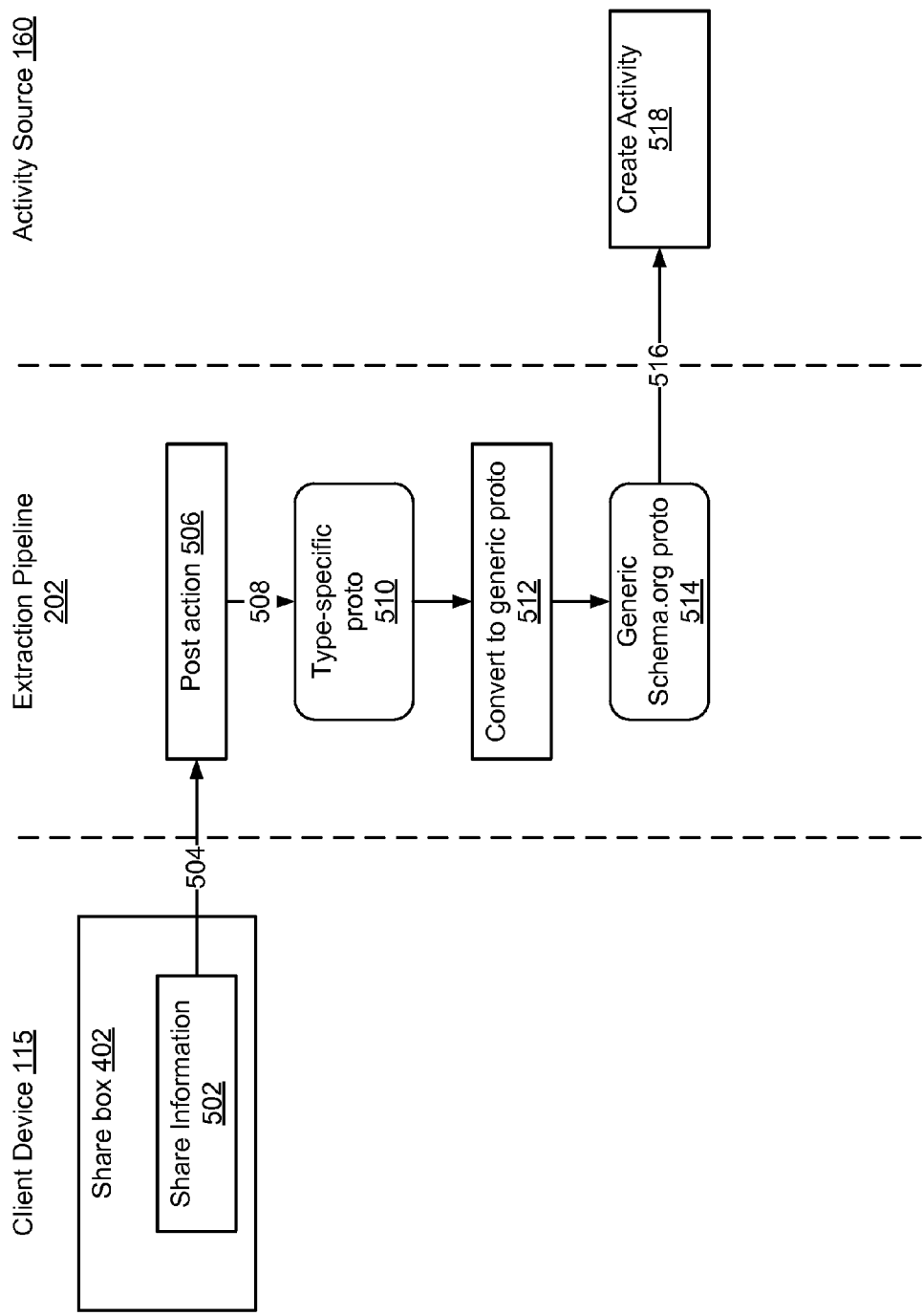
FIG. 5 is a sequence diagram of a share operation of an extraction pipeline according to some embodiments of the present disclosure.

FIG. 5 is a sequence diagram of a share operation of the extraction pipeline 202 according to some embodiments of the present disclosure. FIG. 5 shows the actions performed by the extraction pipeline 202 in a sharing operation and its interaction with the client device 115 and the activity source 160. More generally, FIG. 5 illustrates a process for sending information from the client device 115 to the activity source 160. A sharing operation begins with the display of a share box 402 by the client device 115. The sharing operation may also be initiated by other APIs or other code. The user inputs information that he or she would like to share (Share information 502) within the share box 402. The user selects a share operation such as by selecting a button associated with the share box 402. This causes the client device 115 to send 504 the share information 502 in the share box 402 to the extraction pipeline 202. For example, the client device 115 may send an XML HTTP request to the extraction pipeline 202. In some embodiments, the client device 115 generates a type-specific protocol buffer that is sent 504 to the extraction pipeline 202. The extraction pipeline 202 initiates 506 a post action. The extraction pipeline 202 generates 508 (or extracts from the XML HTTP request) a type-specific protocol buffer (proto) 510. Next, the extraction pipeline 202 converts 512 the type-specific protocol buffer 510 to a generic protocol buffer 514. The extraction pipeline 202 then sends 516 the generic protocol buffer (proto) 514 to the activity source 160, and the activity source 160 creates 518 an activity. The architecture of the present disclosure is advantageous because this two-step conversion process can be utilized for any information that is sent from the client device 115 to the activity source 160 by using the embed converter 214. It should be recognized that the sharing action is used merely as an example, and action or information can be sent from the client device 115 to the activity source 160 in a similar manner.

Figure 6:
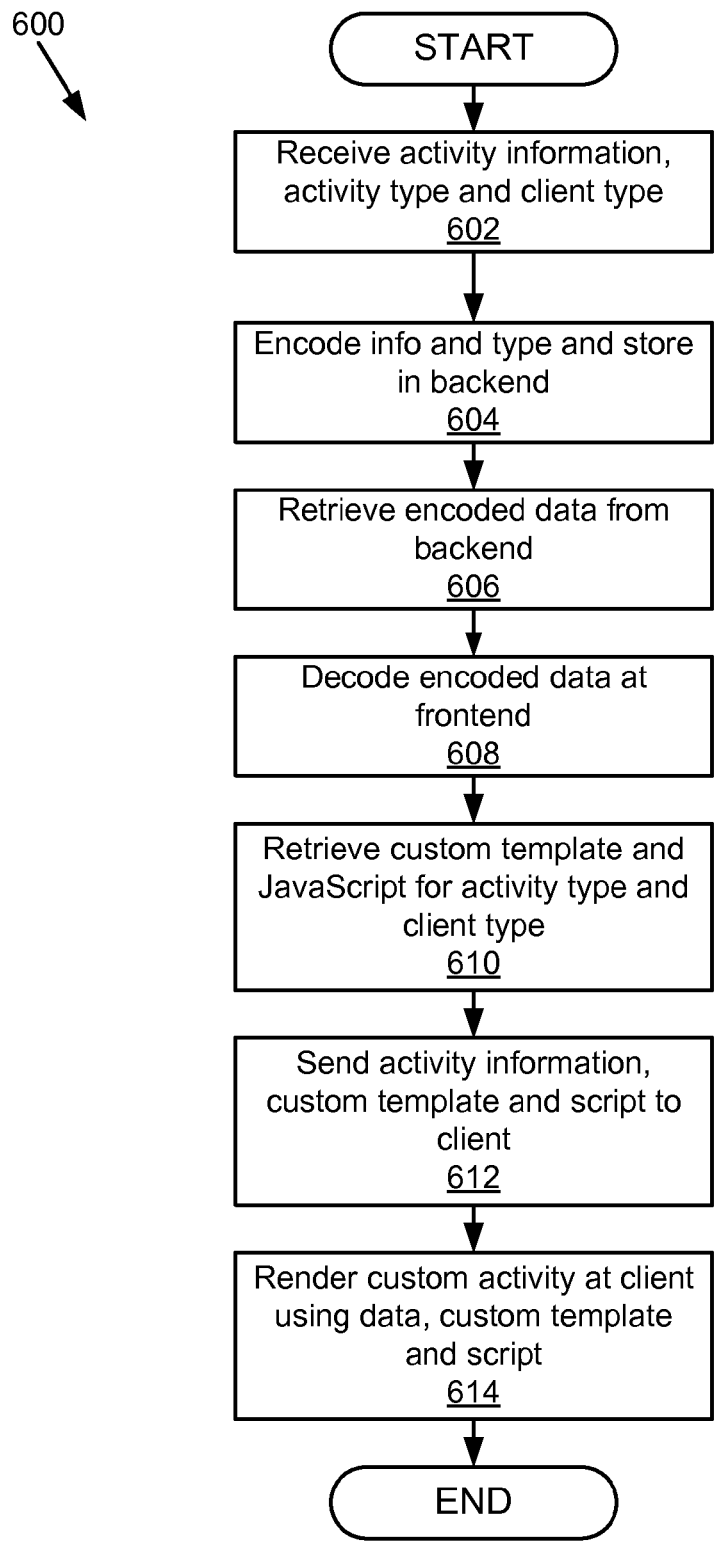
FIG. 6 is a flowchart of a method for storing and rendering custom posts in the activity stream according to some embodiments of the present disclosure.

Referring now to FIG. 6, a method 600 for storing and rendering custom posts in the activity stream is described. The method 600 begins by receiving 602 activity information and an activity type. In some embodiments, a client type is also retrieved or received. In some embodiments, the activity streams backend 154 receives this information from the activity sources 160. In other embodiments, the activity streams backend 154 receives the activity information from the activity sources 160 and determines the activity type and the client type. Next, the method 600 continues by encoding 604 the information from block 402 and storing it at the activity streams backend 154. In some embodiments, the data is immediately sent to the activity streams front end 152. It should be recognized that the activity streams backend 154 repeatedly performs the above process for posts received from the activity sources 160. While the present disclosure will be described in FIGS. 6, 7 and 8 in the context of posts, it will be appreciated that the same process of typing, encoding and decoding can be applied to any type of activity information that is displayable to the user 120 on the client device 115. The method continues at the activity streams front end 152 where the encoded data is received or retrieved 606 from the activity streams backend 154. The activity streams front end 152 decodes 608 the encoded data to produce the activity information and the activity type. Based upon the activity type and the client type, the activity streams front end 152 retrieves 610 a custom template and JavaScript from the custom template storage 156. The activity streams front end 152 then sends 612 the activity information, the custom template and the script to the client device 115. Finally, the method 600 completes with the client device 115 rendering 614 a custom post using the activity information, the custom template and the script.

Figure 7:
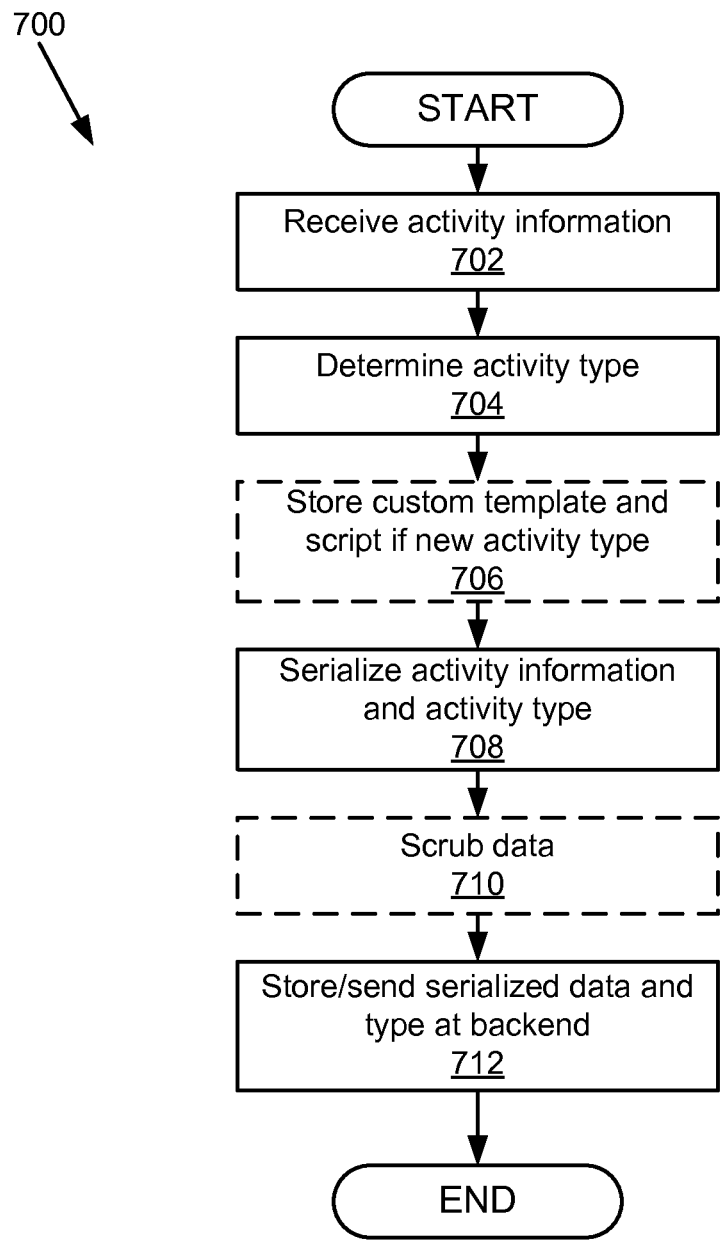
FIG. 7 is a flowchart of a method for storing activity information and an activity type in an activity streams backend according to some embodiments of the present disclosure.

Referring now to FIG. 7, some embodiments of a method 700 for storing activity information and an activity type (and/or a client type) in an activity streams backend 154 is described. The method 700 begins by receiving 702 data or activity information from one or more of the activity sources 160 at the activity streams backend 154. In some embodiments, the activity information is a custom protocol buffer or data map with associations between data and fields. In some embodiments, the same custom protocol buffer is used for activity information. The data may also include a client type. Then the method 700 determines 704 an activity type associated with the received information. In some embodiments, the activity type is provided by the activity sources 160. In other embodiments, the activity streams backend 154 selects an activity type for the activity information based upon one or more of the source of the activity information, the content of the act of information, the functionality associated with the activity information, and the format for displaying the activity information. In some embodiments, there are a number of predefined activity types with associated formatting, functionality, data fields and JavaScript or JavaScript classes. Either the custom template or associated script for the activity type has already been stored in the custom template storage 156 at some time prior, or optionally, the activity streams backend 154 receives the custom template and associated script from the activity sources 160 and stores 706 them in the custom template storage 156. Then the method 700 encodes or serializes 708 the activity information and the activity type into encoded data. In some embodiments, the data is scrubbed 710. In particular when the activity streams backend 154 stores information from a plurality of unrelated third-party sources, the data is scrubbed for security purposes. Finally, the encoded/serialized data is stored in the activity database 360 of the activity streams backend 154. In another embodiment, the encoded/serialized data is stored 712 to a location accessible by both the activity streams backend 154 and the activity streams front end 152. In yet another embodiment, the encoder/serialized data is sent 712 to the activity streams front end 152.

Figure 8:
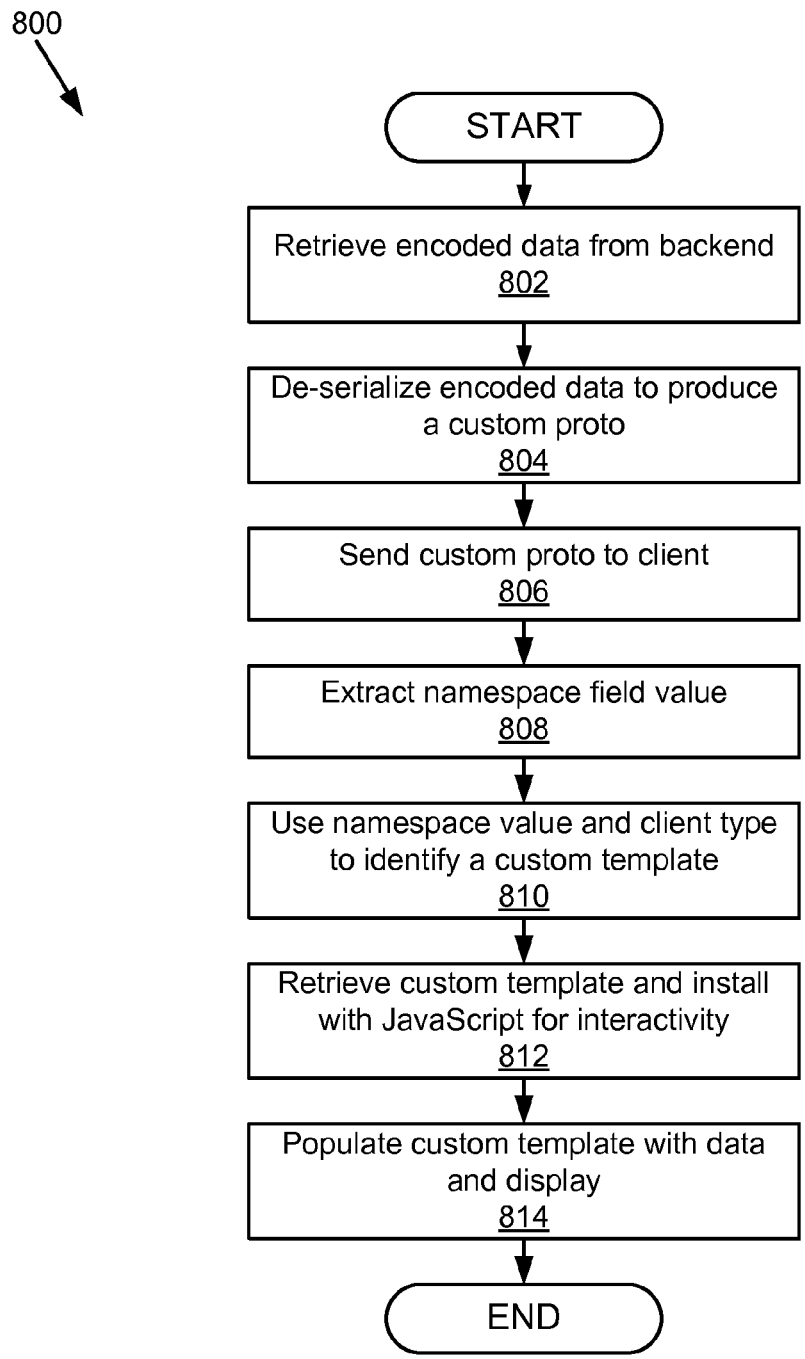
FIG. 8 is a flowchart of a method for rendering custom posts in the activity stream according to some embodiments of the present disclosure.

Referring now to FIG. 8, some embodiments of a method 800 for rendering custom posts in the activity stream will be described. The method 800 begins by retrieving 802 encoded data from the activity streams backend 154. The encoded data is de-serialized 804 to produce the activity information and an activity type. In some embodiments, the activity information and the activity type are in the form of a custom protocol buffer (proto) with defined fields and corresponding data for those fields. In particular, it should be noted that one of the fields that identifies the activity type is a namespace view. Next, the method 800 sends 806 the activity information and the activity type to the client device 115. In some embodiments, the activity streams front end 152 does this by sending the custom protocol buffer (proto) to the client device 115. Next, either the client device 115 or the activity streams front end 152 extracts 808 the namespace field value from the custom protocol buffer. The value in the namespace field and the client type are used 810 to identify which custom template, custom styling and associated JavaScript to retrieve from the custom template storage 156. For each namespace value, there may be numerous different custom templates, custom styling and associated JavaScript according to the client type. Then the client device 115 or the activity streams front end 152 retrieves 812 the custom template and custom styling from the custom template storage 156 and installs them with associated JavaScript for interactivity. Finally the method 800 completes by populating 814 the custom template with data and presents it on the display of the client device 115.

In the above description, for purposes of explanation, numerous specific details are set forth in order to provide a thorough understanding of the disclosure. It will be apparent, however, that the disclosure can be practiced without these specific details. In other instances, structures and devices are shown in block diagram form in order to avoid obscuring the disclosure. Moreover, the present disclosure is described below primarily in the context of a social network; however, it should be understood that the present disclosure applies to any type of communication and can be used to present posts or any type of communication.

Reference in the specification to "one embodiment," "an embodiment," "some embodiments" or "other embodiments" means that a particular feature, structure, or characteristic described in connection with the embodiment is included in at least one embodiment of the present disclosure. The appearances of the phrase "in one embodiment," "some embodiments" or "other embodiments" in various places in the specification are not necessarily all referring to the same embodiment.

Some portions of the detailed descriptions that follow are presented in terms of algorithms and symbolic representations of operations on data bits within a computer memory. These algorithmic descriptions and representations are the means used by those in the data processing arts to most effectively convey the substance of their work to others. An algorithm is here, and generally, conceived to be a self consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present disclosure also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

The disclosure can take the form of an entirely hardware embodiment, an entirely software embodiment or an embodiment containing both hardware and software elements. In a preferred embodiment, the disclosure is implemented in software, which includes but is not limited to firmware, resident software, microcode, etc.

Furthermore, the disclosure can take the form of a computer program product accessible from a computer-usable or computer-readable medium providing program code for use by or in connection with a computer or any instruction execution system. For the purposes of this description, a computer-usable or computer-readable medium can be any apparatus that can include, store, communicate, propagate, or transport the program for use by or in connection with the instruction execution system, apparatus, or device.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the present disclosure is not described with reference to any particular programming language. It will be appreciated that a variety of programming languages may be used to implement the teachings of the disclosure as described herein.

The foregoing description of the embodiments of the present disclosure has been presented for the purposes of illustration and description. It is not intended to be exhaustive or to limit the present disclosure to the precise form disclosed. Many modifications and variations are possible in light of the above teaching. It is intended that the scope of the present disclosure be limited not by this detailed description, but rather by the claims of this application. As will be understood by those familiar with the art, the present disclosure may be embodied in other specific forms without departing from the spirit or essential characteristics thereof. Likewise, the particular naming and division of the modules, routines, features, attributes, methodologies and other aspects are not mandatory, and the mechanisms that implement the present disclosure or its features may have different names, divisions and/or formats. Furthermore, as will be apparent to one of ordinary skill in the relevant art, the modules, routines, features, attributes, methodologies and other aspects of the present disclosure can be implemented as software, hardware, firmware or any combination of the three. Also, wherever a component, an example of which is a module, of the present disclosure is implemented as software, the component can be implemented as a standalone program, as part of a larger program, as a plurality of separate programs, as a statically or dynamically linked library, as a kernel loadable module, as a device driver, and/or in every and any other way known now or in the future to those of ordinary skill in the art of computer programming. Additionally, the present disclosure is in no way limited to implementation in any specific programming language, or for any specific operating system or environment. Accordingly, the disclosure of the present disclosure is intended to be illustrative, but not limiting, of the scope of the present disclosure, which is set forth in the following claims.

What is claimed is:

1. A computer-implemented method for processing posts in activity streams, comprising:
   receiving, with one or more computing devices, a client type specifying a type of a client device;
   receiving, with the one or more computing devices, activity information from an activity source;
   receiving, with the one or more computing devices, an activity type;
   creating, with the one or more computing devices, a first protocol buffer using the activity type and the activity information;
   selecting, with the one or more computing devices, embedded code from a library of embedded code based in part upon the client type and the activity type;
   adding, with the one or more computing devices, the embedded code to the first protocol buffer to create a second protocol buffer; and
   sending, with the one or more computing devices, the second protocol buffer for rendering of the activity information.

2. The method of claim 1 further comprising storing, with the one or more computing devices, the first protocol buffer at an extraction pipeline.

3. The method of claim 1 wherein creating the first protocol buffer also uses the client type to determine the first protocol buffer.

4. The method of claim 1 wherein the first protocol buffer is a generic schema.org protocol buffer.

5. The method of claim 1 further comprising storing, with the one or more computing devices, the second protocol buffer at an extraction pipeline.

6. The method of claim 1 wherein the second protocol buffer is a type-specific protocol buffer.

7. The method of claim 1 wherein the embedded code includes a type-specific protocol buffer, Java, JavaScript, one or more custom templates, and custom styling.

8. The method of claim 1 wherein the first protocol buffer is a serialization format with an interface description language.

9. A computer program product comprising a non-transitory computer usable medium including a computer readable program, wherein the computer readable program when executed on a computer causes the computer to:
   receive a client type specifying a type of a client device;
   receive activity information from an activity source;
   receive an activity type;
   create a first protocol buffer using the activity type and the activity information;
   select embedded code from a library of embedded code based in part upon the client type and the activity type;
   add the embedded code to the first protocol buffer to create a second protocol buffer; and
   send the second protocol buffer for rendering of the activity information.

10. The computer program product of claim 9, wherein the computer readable program when executed on the computer also causes the computer to store the first protocol buffer at an extraction pipeline.

11. The computer program product of claim 9, wherein the client type is used to determine the first protocol buffer.

12. The computer program product of claim 9, wherein the first protocol buffer is a generic schema.org protocol buffer.

13. The computer program product of claim 9, wherein the computer readable program when executed on the computer also causes the computer to store the second protocol buffer at an extraction pipeline.

14. The computer program product of claim 9, wherein the second protocol buffer is a type-specific protocol buffer.

15. The computer program product of claim 9, wherein the embedded code includes a type-specific protocol buffer, Java, JavaScript, one or more custom templates, and custom styling.

16. The computer program product of claim 9, wherein the first protocol buffer is a serialization format with an interface description language.

17. A computer-implemented method for processing posts in an activity stream, executing on one or more computing devices, the method comprising:
   receiving, with the one or more computing devices, a client type specifying a type of a client device;
   receiving, with the one or more computing devices, an activity type;
   receiving, with the one or more computing devices, activity information from the client device;

creating, with the one or more computing devices, a type-specific protocol buffer based in part upon the client type and the activity type;
select embedded code from a library of embedded code based in part upon the client type and the activity type:
converting, with the one or more computing devices, the type-specific protocol buffer to a generic protocol buffer using the selected embedded code; and
sending, with the one or more computing devices, the generic protocol buffer to an activity source, the activity source being different from the client device.

18. The method of claim 17 wherein the activity type is a post of information.

19. The method of claim 17 wherein the generic protocol buffer is a generic schema.org protocol buffer.

20. A system for processing posts in an activity stream, the system comprising:
one or more processors;
the one or more processors being configured to:
receive a client type specifying a type of a client device;
receive activity information from an activity source;
receive an activity type;
create a first protocol buffer using the activity type and the activity information;
select embedded code from a library of embedded code based in part upon the client type and the activity type;
add the embedded code to the first protocol buffer to create a type-specific protocol buffer; and
send the type-specific protocol buffer to the client device for rendering of the activity information.

21. The system of claim 20, wherein the activity source is one or more from a group of a social network server, a third party server, a micro-blogging server, a profile server, a SMS/MMS server, an IM server, a search server and a web server.

22. The system of claim 20, wherein the embedded code includes an associated script, and a data map with associations between data and fields.

23. The system of claim 20, wherein the embedded code is retrieved from a library of embedded code, and the library of embedded code includes a plurality of customized embedded codes, each of the customized embedded codes for processing information related to a specific activity type.

24. The system of claim 20, wherein the one or more processors are further configured to communicate with the activity source and provide activity information to a data type taxonomy.

25. The system of claim 20, wherein the one or more processors are further configured to communicate with the client device and determine the client type.

* * * * *